(12) United States Patent
Park

(10) Patent No.: US 11,754,170 B1
(45) Date of Patent: Sep. 12, 2023

(54) OIL GUIDE DEVICE

(71) Applicant: Hyundai Transys Inc., Seosan-si (KR)

(72) Inventor: Su In Park, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/075,736

(22) Filed: Dec. 6, 2022

(30) Foreign Application Priority Data

Jul. 12, 2022 (KR) .................. 10-2022-0085812

(51) Int. Cl.
*F16H 57/04* (2010.01)

(52) U.S. Cl.
CPC ..... *F16H 57/0426* (2013.01); *F16H 57/0423* (2013.01); *F16H 57/0446* (2013.01)

(58) Field of Classification Search
CPC ............. F16H 57/0446; F16H 57/0423; F16H 57/0426
See application file for complete search history.

(56) References Cited

U.S. PATENT DOCUMENTS

| | | | | |
|---|---|---|---|---|
| 4,241,959 A | * | 12/1980 | Frister | F16N 7/36 384/472 |
| 4,480,492 A | * | 11/1984 | Fujioka | F16H 57/0482 184/6.12 |
| 4,987,974 A | * | 1/1991 | Crouch | F16N 21/00 464/7 |
| 5,154,517 A | * | 10/1992 | Hodge | F16C 33/6677 384/515 |
| 8,905,192 B2 | * | 12/2014 | Araki | F16H 57/0426 184/6.12 |
| 9,115,592 B2 | * | 8/2015 | Gauthier | F16J 15/3288 |
| 9,651,137 B2 | * | 5/2017 | Yoshizawa | F16H 57/0457 |
| 2008/0128212 A1 | * | 6/2008 | Utzat | F16H 57/0427 192/70.12 |
| 2009/0247347 A1 | * | 10/2009 | Choi | F16H 57/0482 475/159 |
| 2012/0129614 A1 | * | 5/2012 | Knoblauch | F16H 57/0427 464/7 |
| 2019/0093754 A1 | * | 3/2019 | Heki | F16H 57/0471 |
| 2019/0154136 A1 | * | 5/2019 | Zwerger | F16H 57/0423 |

FOREIGN PATENT DOCUMENTS

| | | | | |
|---|---|---|---|---|
| CN | 107110302 B | * | 6/2019 | .............. F16H 1/32 |
| EP | 3018386 A1 | * | 5/2016 | ......... F16H 57/0423 |
| KR | 10-2021-0073625 A | | 6/2021 | |

* cited by examiner

*Primary Examiner* — Michael A Riegelman
(74) *Attorney, Agent, or Firm* — Bridgeway IP Law Group, PLLC; Jihun Kim

(57) ABSTRACT

The present invention provides an oil guide device including a body part, an oil flow path extending from one surface of the body part and coupled to an inner diameter portion of a pinion shaft, a first guide configured to allow oil scattering in an automatic transmission to be introduced into an inner diameter portion of the oil flow path, the first guide being disposed on the other surface of the body part and configured to surround the inner diameter portion of the oil flow path, and a second guide extending from an outer diameter portion of the other surface of the body part and configured to surround the first guide, the second guide being configured to guide the remaining oil, which is not directed toward the first guide, to a desired component.

6 Claims, 3 Drawing Sheets

OIL GUIDE DEVICE

CROSS-REFERENCE TO RELATED APPLICATIONS

This application claims priority to and the benefit of Korean Patent Application No. 10-2022-0085812 filed in the Korean Intellectual Property Office on Jul. 12, 2022, the entire contents of which are incorporated herein by reference.

TECHNICAL FIELD

The present invention relates to an oil guide device mounted on a carrier of an automatic transmission for a vehicle.

BACKGROUND ART

In general, oil in an automatic transmission may be scattered by a gear shifting operation of the automatic transmission. The scattering oil may be transferred toward a pinion shaft by an oil guide device mounted on a carrier of the automatic transmission.

A carrier assembly of the automatic transmission includes the pinion shaft, a washer, a needle bearing, and a pinion gear. The oil guide device mounted on the carrier in the related art supplies the scattering oil to the needle bearing through an inner diameter portion (hollow hole) of the pinion shaft. The oil guide device in the related art may be typically manufactured by injection-molding a plastic material or pressing a board.

However, because the oil guide device in the related art is structured to supply the oil only to the pinion bearing, the remaining oil is inevitably scattered and lost.

DOCUMENT OF RELATED ART

Patent Document (Patent Document 1) Korean Patent Application Laid-Open No. 10-2021-0073625 (published on Jun. 21, 2021)

SUMMARY OF THE INVENTION

The present invention has been made in an effort to solve the above-mentioned problems, and an object of the present invention is to provide an oil guide device that guides a part of oil scattering in an automatic transmission to an oil flow path through a first guide and supplies the oil to a pinion bearing, the oil guide device having a second guide to supply the remaining oil to a desired component.

To achieve the above-mentioned object, the present invention provides an oil guide device including: a body part; an oil flow path extending from one surface of the body part and coupled to an inner diameter portion of a pinion shaft; a first guide configured to allow oil scattering in an automatic transmission to be introduced into an inner diameter portion of the oil flow path, the first guide being disposed on the other surface of the body part and configured to surround the inner diameter portion of the oil flow path; and a second guide extending from an outer diameter portion of the other surface of the body part and configured to surround the first guide, the second guide being configured to guide the remaining oil, which is not directed toward the first guide, to a desired component.

The second guide may include: a first extension portion extending from the outer diameter portion of the other surface of the body part and configured to surround the first guide; and a second extension portion extending from the first extension portion.

The first extension portion may have an acute angle with respect to the first guide.

The second extension portion may be inclined to be bent outward from a boundary portion between the first extension portion and the second extension portion.

A boundary portion between the first extension portion and the second extension portion may be rounded.

The oil flow path may be provided in the form of a pipe.

The first guide may have a circular arc shape that surrounds the inner diameter portion of the oil flow path.

According to the present invention, a part of oil scattering in the automatic transmission is guided to the oil flow path through the first guide and supplied to the pinion bearing.

According to the present invention, the second guide extending from the body part may be provided to supply the remaining oil, which has not been supplied to the pinion bearing, to a desired component.

According to the present invention, a separate device capable of supplying oil to a desired component is not required in addition to the oil guide device. Therefore, it is possible to reduce weight and material costs.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
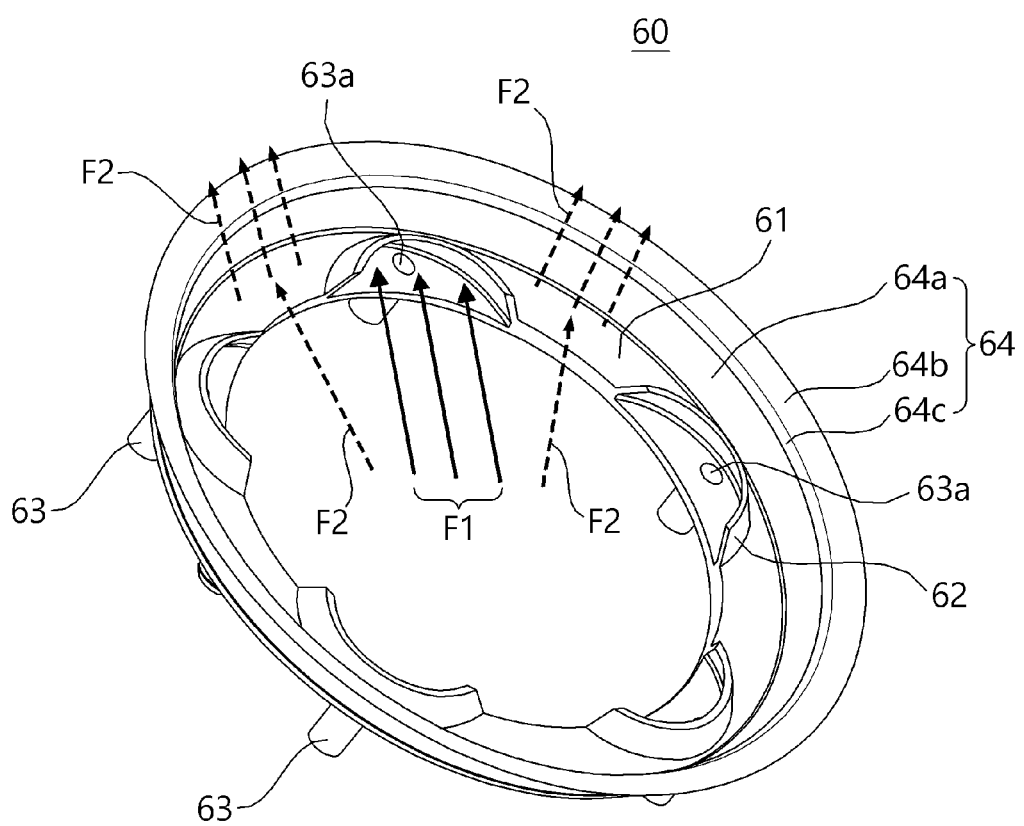
FIG. 1 is a perspective view of an oil guide device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
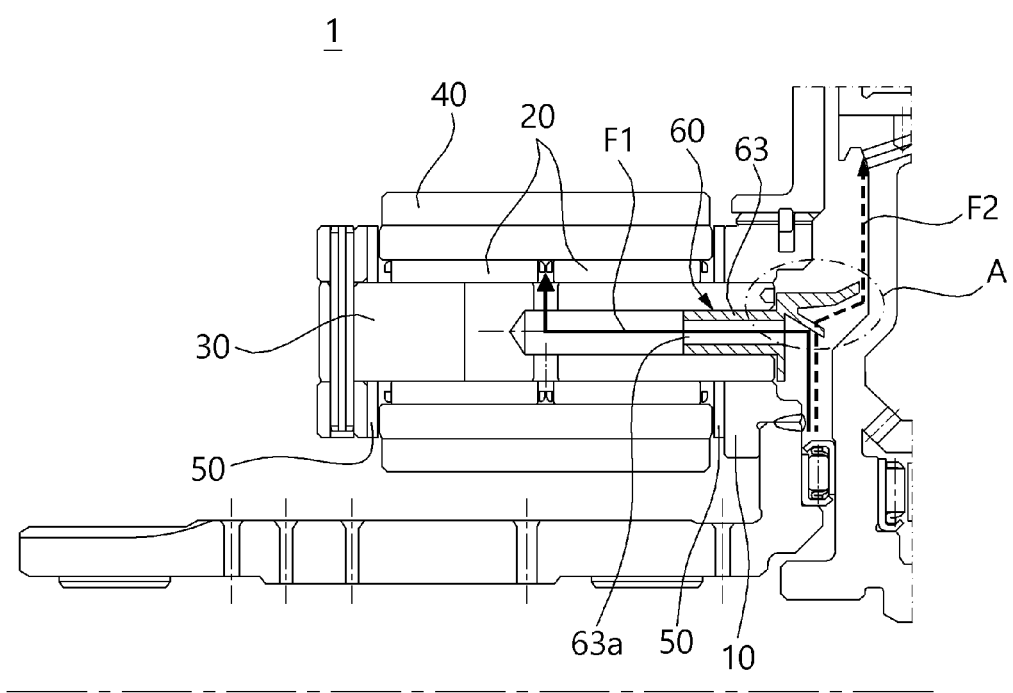
FIG. 2 is a view illustrating a state in which the oil guide device according to the exemplary embodiment of the present invention is mounted on a carrier.
Figure 3:
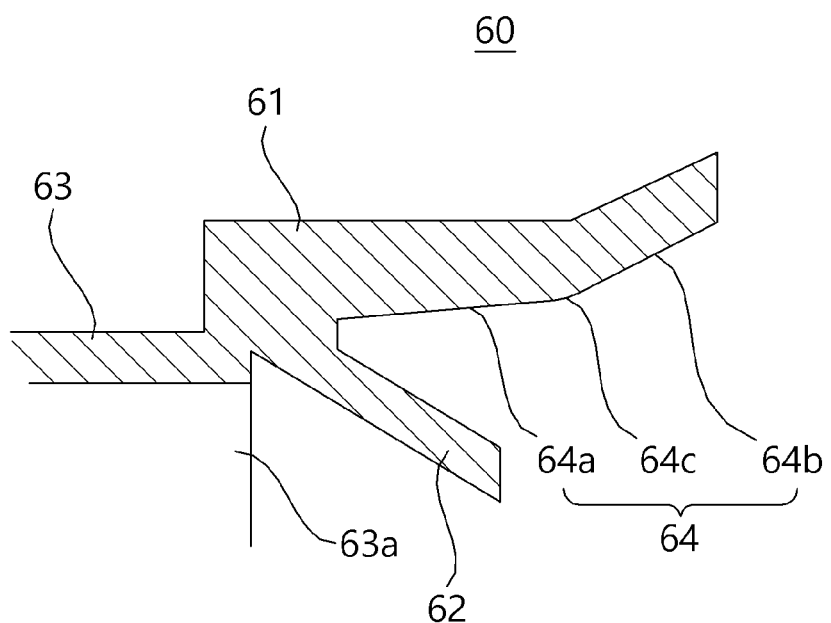
FIG. 3 is an enlarged view of part A in FIG. 2.

FIG. 1 is a perspective view of an oil guide device according to an exemplary embodiment of the present invention, FIG. 2 is a view illustrating a state in which the oil guide device according to the exemplary embodiment of the present invention is mounted on a carrier, and FIG. 3 is an enlarged view of part A in FIG. 2.

As illustrated in FIGS. 1 to 3, an oil guide device 60 of the present invention may be mounted on a carrier 10 of an automatic transmission 1.

A carrier assembly of the automatic transmission 1 includes a pinion shaft 30, a washer 50, a needle bearing 20, and a pinion gear 40.

The oil guide device 60 of the present invention includes a body part 61, an oil flow path 63 extending from one surface of the body part 61 directed toward the pinion shaft 30, a first guide 62 disposed on the other surface of the body part 61 and configured to surround an inner diameter portion 63a of the oil flow path 63, and a second guide 64 extending from the other surface of the body part 61 and configured to surround the first guide 62.

The body part 61 may be provided in the form of a circular plate having the inner diameter portion. The body part 61 may have a predetermined thickness.

The oil flow path 63 is coupled to the inner diameter portion of the pinion shaft 30. A part of oil F1 in the automatic transmission 1 may be introduced into the oil flow path 63 by the first guide 62. A part of the oil F1, which is introduced into the inner diameter portion 63a of the oil flow path 63 by the first guide 62, may be supplied to the needle bearing 20.

For example, the oil flow path 63 is provided in the form of a pipe. The oil flow path 63 may be provided as a plurality of oil flow paths 63 capable of being respectively coupled to the plurality of pinion shafts 30.

The first guide 62 allows a part of the oil F1 scattering in the automatic transmission 1 to be smoothly introduced into the inner diameter portion 63a of the oil flow path 63.

The first guide 62 may serve to collect oil and transfer the oil to the inner diameter portion 63a of the oil flow path 63. For example, the first guide 62 may have an arc shape that surrounds the inner diameter portion 63a of the oil flow path 63. The first guides 62 may be provided as a plurality of first guides 62 that respectively corresponds to the plurality of oil flow paths 63.

The second guide 64 surrounds the first guide 62. The second guide 64 extends from an outer diameter portion of the other surface of the body part 61. The second guide 64 may collect a part of oil F2, which is not directed toward the first guide 62, and transfer the oil to a desired component.

Specifically, the second guide 64 includes a first extension portion 64a extending from the body part 61, and a second extension portion 64b extending from the first extension portion 64a.

The first extension portion 64a extends from the outer diameter portion of the other surface of the body part 61 and surrounds the first guide 62. The first extension portion 64a may be inclined to have an acute angle with respect to the first guide 62.

The second extension portion 64b may be inclined to be bent outward from the body part 61 so that the oil is supplied from a boundary portion 64c between the first extension portion 64a and the second extension portion 64b to a desired component.

The boundary portion 64c between the first extension portion 64a and the second extension portion 64b may be rounded. In case that the boundary portion 64c between the first extension portion 64a and the second extension portion 64b is rounded, the oil may smoothly move from the first extension portion 64a to the second extension portion 64b.

Next, an operation of the oil guide device according to the present invention will be described.

The oil F1 and F2 scattering in the automatic transmission 1 may move, as indicated by the arrow illustrated in FIG. 2.

Specifically, as indicated by the straight arrow illustrated in FIG. 2, a part of the oil F1 scattering in the automatic transmission 1 may be moved to the oil flow path 63 by the first guide 62.

Because the oil flow path 63 is coupled to the inner diameter portion of the pinion shaft 30, a part of the oil F1, which is introduced into the inner diameter portion 63a of the oil flow path 63 by the first guide 62, may be supplied to the needle bearing 20 along the inner diameter portion of the pinion shaft 30.

The oil supplied to the needle bearing 20 may reduce a frictional force occurring on a friction surface of the needle bearing 20 and reduce frictional heat generated on the friction surface of the needle bearing 20.

The remaining oil F2, which is not directed toward the first guide 62, may be supplied to a desired component by the second guide 64, as indicated by the dotted arrow illustrated in FIG. 2.

Specifically, the remaining oil F2, which is not directed toward the first guide 62, may be smoothly supplied to a desired component along the inclined first and second extension portions 64a and 64b. Because the boundary portion 64c between the first and second extension portions 64a and 64b is rounded, the oil may smoothly move from the first extension portion 64a along the boundary portion 64c and the second extension portion 64b.

In case that only the oil flow path and the first guide are provided, only a part of the oil is supplied to the pinion shaft, and the remaining oil, which is not collected by the first guide, is inevitably lost.

However, according to the present invention, the second guide 64 is provided in addition to the first guide 62. Therefore, the remaining oil F2, which is not collected by the first guide 62, may be collected by the second guide 64 and supplied to a desired component at the same time when a part of the oil F1 is supplied to the oil flow path 63 by the first guide 62. In addition, according to the present invention, a separate device capable of supplying oil to a desired component is not required in addition to the oil guide device. Therefore, it is possible to reduce a weight and material costs.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An oil guide device comprising:
a body part;
an oil flow path extending from one surface of the body part and coupled to an inner diameter portion of a pinion shaft;
a first guide configured to allow oil scattering in an automatic transmission to be introduced into an inner diameter portion of the oil flow path, the first guide being disposed on the other surface of the body part and configured to surround the inner diameter portion of the oil flow path; and
a second guide extending from an outer diameter portion of the other surface of the body part and configured to surround the first guide, the second guide being configured to guide the remaining oil, which is not directed toward the first guide, to a desired component,
wherein the second guide comprises:
a first extension portion extending from the outer diameter portion of the other surface of the body part and configured to surround the first guide; and
a second extension portion extending from the first extension portion.

2. The oil guide device of claim 1, wherein the first extension portion has an acute angle with respect to the first guide.

3. The oil guide device of claim 1, wherein the second extension portion is inclined to be bent outward from a boundary portion between the first extension portion and the second extension portion.

4. The oil guide device of claim 1, wherein a boundary portion between the first extension portion and the second extension portion is rounded.

5. The oil guide device of claim 1, wherein the oil flow path is provided in the form of a pipe.

6. The oil guide device of claim 1, wherein the first guide has a circular arc shape that surrounds the inner diameter portion of the oil flow path.

* * * * *